United States Patent
Trummer

(10) Patent No.: US 7,433,573 B2
(45) Date of Patent: Oct. 7, 2008

(54) DISTANCE MEASURING DEVICE AND METHOD FOR DETERMINING A DISTANCE

(75) Inventor: Günther Trummer, Baiersdorf (DE)

(73) Assignee: Astyx GmbH, Ottobrun (DE)

( * ) Notice: Subject to any disclaimer, the term of this patent is extended or adjusted under 35 U.S.C. 154(b) by 0 days.

(21) Appl. No.: 11/471,297

(22) Filed: Jun. 20, 2006

(65) Prior Publication Data

US 2007/0003210 A1    Jan. 4, 2007

Related U.S. Application Data

(62) Division of application No. 10/504,618, filed as application No. PCT/EP03/00894 on May 21, 2003, now Pat. No. 7,095,944.

(30) Foreign Application Priority Data

Feb. 13, 2002    (DE)    ............................. 102 05 904

(51) Int. Cl.
   *G02B 6/00*    (2006.01)
(52) U.S. Cl. ..................................... 385/147
(58) Field of Classification Search .................. 385/147
   See application file for complete search history.

(56) References Cited

U.S. PATENT DOCUMENTS 4,901,628 A * 2/1990 Krage ........................ 92/5 R
5,150,049 A * 9/1992 Schuetz .................. 324/207.12
5,963,108 A * 10/1999 Qvist ......................... 333/1.1
6,359,445 B1 * 3/2002 Pfizenmaier et al. ........ 324/636
6,445,193 B1 * 9/2002 Trummer et al. ............ 324/644
6,484,620 B2 * 11/2002 Arshad et al. ............... 92/5 R
6,722,261 B1 * 4/2004 Brown et al. ................ 92/5 R

FOREIGN PATENT DOCUMENTS

| DE | 198 33 220 A1 | 6/1999 |
| DE | 198 00 306 A1 | 7/1999 |
| DE | 199 03 183 A1 | 3/2001 |
| DE | 199 44 103 A1 | 3/2002 |
| EP | 0 935 127 A | 8/1999 |

* cited by examiner

*Primary Examiner*—Ellen Kim
(74) *Attorney, Agent, or Firm*—The Small Patent Law Group; Dean D. Small

(57) ABSTRACT

The invention relates to a distance measuring device and a suitable method for determining a distance which provides for continuous determination of the distance which can therefore also be made discrete and in addition is easy to handle and provides for a large variety of applications. The distance measuring device comprises analytical electronics and a sensor facility, which comprises at least one coupling probe for feeding an emitted signal into a conducting structure with reflection body. Moreover, the conducting structure comprises a feeding block with a feeding area connecting an HF transceiver via a wave guide with dielectric support system to the coupling probe.

18 Claims, 1 Drawing Sheet

DISTANCE MEASURING DEVICE AND METHOD FOR DETERMINING A DISTANCE

CROSS REFERENCE TO RELATED APPLICATIONS

This Application claims the benefit of U.S. patent application Ser. No. 10/504,618, filed May 4, 2005 now U.S. Pat. No. 7,095,944, PCT Patent Application Number PCT/EP03/00894, filed Jan. 29, 2003 and German application DE 102 05 904.7 filed Feb. 13, 2002 which are hereby incorporated by reference in their entirety.

BACKGROUND OF THE INVENTION

The present invention relates generally to a distance measuring device and a method for determining a distance.

For the detection and recording of the position of the piston of fluidic linear drives or pneumatic and hydraulic cylinders as the conducting structure, it is generally known to use distance measuring devices measuring the distance between the piston serving as a reflecting body inside the conducting structure and the cylinder lid or bottom of the conducting structure. The detection of the piston position in cylinders can be performed either discrete, i.e. at discrete sites, or continuous, i.e. continuously during operation.

A discrete determination of piston position is usually applied in order to feedback the performance or completion of a piston movement to a process control (e.g. SPS), for example in order to be able to initiate the next process step. Magnetic field-sensitive sensors or sensor facilities are used predominantly for this purpose, which detect the magnetic field of a permanent magnet residing on the cylinder piston. The sensors used for detection are mounted to the outside of the cylinder tube. When the piston moves into the detection area of a sensor of this type, the sensor detects the presence of the cylinder piston through the cylinder tube. In the majority of cases, this requires the use of non-ferromagnetic materials and thus limits the design properties and/or applications of the drive. However, if a different position of the piston is to be detected, the sensor needs to be mechanically adjusted or newly adjusted accordingly. Therefore, an additional sensor must be mounted for each additional position to be detected, which is associated with additional material, mounting, adjustment, and installation costs in each case.

Another disadvantage is that the mounting usually is performed on customer premises. The situation is aggravated if the cylinder is already assembled in a machine that is difficult to access such that it may be impossible to adjust the sensing distances by mechanical shifting of the externally mounted magnetic switches. Moreover, these externally mounted sensors require additional space. Often additional design work is required in order to provide for the accessibility and robustness of the sensor.

Sensors of this type are implemented predominantly in the form of magnetic field-sensitive sensors and are known as Reed switches, magneto-resistive (MR), giant magneto-resistive (GMR), Hall switches or magneto-inductive proximity switches. However, the detection of the magnetic field requires extensive adjustment of the magnet to the sensor and/or sensor facility. Moreover, this measuring principle limits the possible applications because of interfering static or dynamic magnetic fields (EMV, field of a cylinder in close proximity) and the temperature properties of the sensor.

For continuous piston position measurement, it is common to use measuring systems based on potentiometry, the linear variable differential transformer (LVDT) principle or the ultrasound principle. In these systems, the position of the piston is output continuously and, in the majority of cases, as an analogous voltage signal. Sensors working according to the LVDT principle always require a calibration run for pre-adjustment after being turned on. Ultrasound sensors are suitable only to a limited degree for path length measurements in pneumatic or hydraulic cylinders, since the accuracy of measurement changes with cylinder pressure. Incremental path length measurements supplementing these systems are also known. These systems are implemented for example by coding the piston rod and thus can be used only for relative path length measurements.

In summary, both the continuous and the discrete determination of piston position according to the prior art can be integrated into a cylinder either not at all or only with substantial design efforts which are associated with high costs. Substantial design efforts are required because all common sensor principles described above must be adjusted to the respective cylinder length, since their detection area is too short.

It is desirable to create a distance measuring device and a method for determining the distance, which overcome the disadvantages listed above and provide for continuous determination of the distance which can therefore also be made discrete and in addition is easy to handle and provides for a large variety of applications.

BRIEF DESCRIPTION OF THE INVENTION

According to one embodiment of the invention, a conducting structure is provided, which comprises a feeding block with a feeding area connecting an HF transceiver via a wave guide with dielectric support systems with the coupling probe. This arrangement according to the invention provides for the complete integration of the coupling probe including analytical electronics in the lid of the cylinder. Additional parts to be mounted externally are not required. The corresponding sensing distances can be set externally by means of an electronic interface, preferably by the analytical electronics. As a matter of principle, the distance measuring device according to the invention is universally applicable independent of the length of the cylinder. Moreover, it has become apparent that the measuring results are reliably correct independent of the pressure, oil, and humidity inside the cylinder.

According to another embodiment of the invention, a distance measuring device and a method for determining a distance are provided, whereby the sensor facility comprises a high frequency feeding system whose function is to measure a certain distance, for example inside a conducting structure (the conducting structure is for example the inner space of the pneumatic cylinder=circular wave guide) by emitting and receiving waves, for example by integrating the feeding system into the conducting structure. Due to this integration of the feeding system, the distance measuring device can be built very small in size and requires almost no or little modification. Consequently, the entire assembly of the distance measuring device according to the invention can have a clean, smooth design, since no mounting of external sensor facilities is needed, and/or does not modify the external appearance. The distance measuring device according to the invention provides for savings of installation costs, since the premade cylinder comprises only a connecting cable for the excitation and the recording of data. According to the method according to the invention, the length of the conducting structure is measured up to a short-circuit (e.g. the piston as reflection body in pneumatic or hydraulic cylinder), the position of which can be varied. The emitted signal provided according to the method according to the invention is fed into a conducting structure and reflected preferably by a short-circuit, for example by a cylinder piston serving as reflection body. Therefore, the measurement captures the distance between the feeding point defined by the coupling probe and the short-circuit of the conducting structure. The distance to be measured is determined by measuring the phase difference between the emitted and the received signal.

Measuring the distance between the feeding points defined by the coupling probe and the reflection body through the use of at least two emitted signals in the form of electromagnetic waves differing in frequency, the position can be measured unambiguously, provided the conducting structure to be measured is smaller than half the wavelength that is employed. In this context it is important to note that, independent of the selected feeding, at least three measuring frequencies can be selected for unambiguous determination of position. However, in practical applications, it has proven advantageous to use four frequencies, especially since doing so improves the error tolerance of the algorithm.

A dielectric secondary ring serves as a limit stop safety device for the moving reflection body and has been taken into consideration in the electromagnetic design of the feeding system.

It proved to be particularly advantageous to provide the conducting structure in the form of a circular wave guide, such as a cylinder with a piston as the reflection body. For example a pneumatic cylinder or a hydraulic cylinder can provide a circular wave guide of this type. Thus, the prior disadvantages are overcome in particular for these applications.

Providing bore holes in the feeding block allowing the insertion of the support system, the coupling probe, and the coaxial feeding area renders the mounting simple and the entire distance measuring device can be integrated into existing conducting structure virtually without limitations.

The coupling probe also may be provided as a monopole excitation system and the electromagnetic wave to be fed-in coaxially such that a circular wave guide wave can be fed-in and converted to the monopole by a multi-step coaxial transformation step. The use of the multi-step coaxial transformation step, which can have a planar base area, in the middle of which an electrically conductive cylinder is provided, and next to which is an electrically conductive pin as the inner conductor of the coaxial feeding, ensures that the entire feeding is simple.

The support system consists of a dielectric, e.g. Lexan, and serves to position the coupling probe inside the cylinder. In addition, it provides for the required mechanical stability in the presence of a pressure load (e.g. 10 bar in the pneumatic cylinder). The feeding block is particularly cost-efficient to implement in mass production by inserting the monopole excitation system in the lid of the cylinder, while the dielectric support system firmly connects this to the cylinder lid by means of a plastic jet molding procedure.

An electromagnetic wave with a high frequency of between 1 to 25 GHz may be provided in. Depending on the dimensions and/or gauging of the cylinder used as the conducting structure and the wave mode, a suitable frequency above the lower limit frequency of the wave mode employed, is selected.

DETAILED DESCRIPTION OF THE INVENTION

Figure 1:
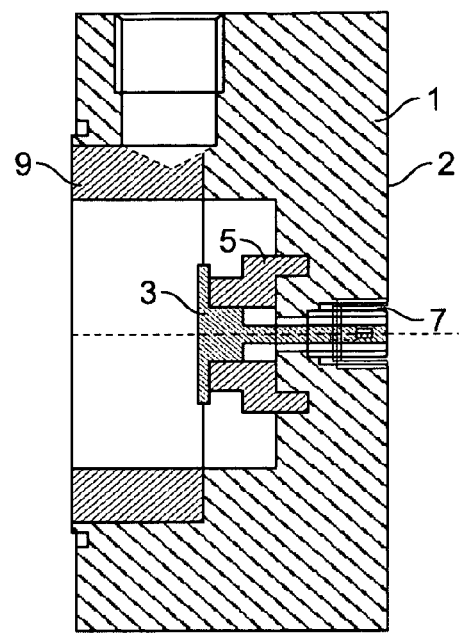
FIG. 1 shows a sectional view of the distance measuring device in an assembled conducting structure.

FIG. 1 shows the distance measuring device according to an embodiment of the invention with conducting structure 1 and feeding block with feeding area 2, whereby the feeding area comprises a coupling probe 3 by means over a dielectric support system 5 with the wave guide 7. Also shown is the dielectric secondary ring 9 which serves, on one hand, as a mechanical limit stop safety device and, on the other hand, as secondary adjustment and emission system.

Figure 2:
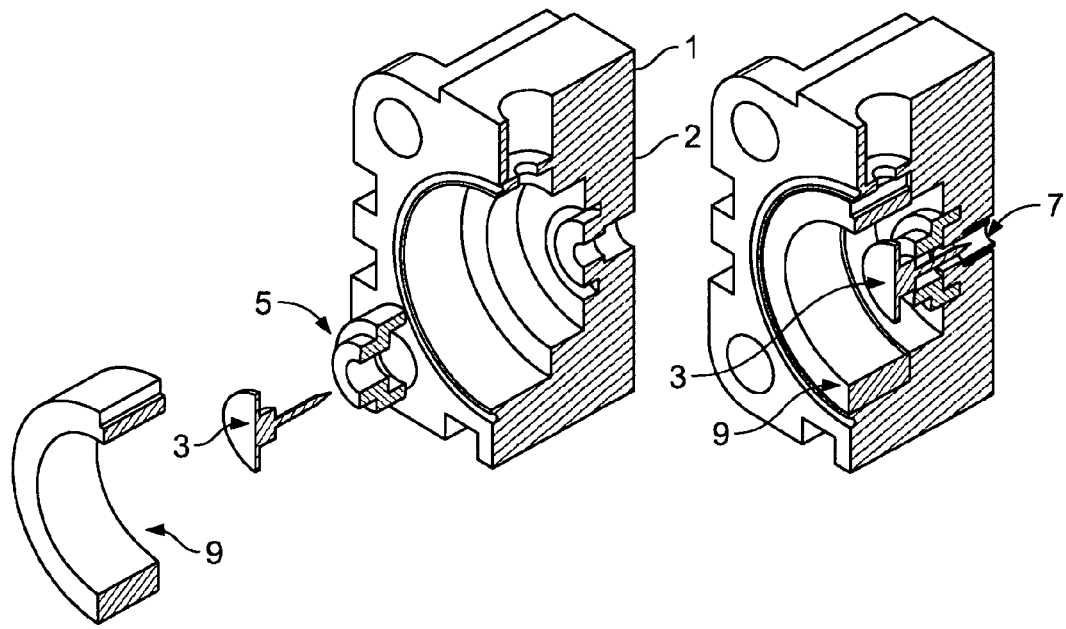
FIG. 2 shows a perspective exploded view of the distance measuring device according to the invention (left side) and of the distance measuring device according to the invention in the assembled state (right side).

The individual components of the distance measuring device according to an embodiment of the invention are shown more clearly in FIG. 2, whereby the essential components, such as feeding block with a feeding area 2 are shown in an exploded view. It is also clearly evident therefrom that the dielectric support system supports the coupling probe 3, which is implemented in the form of a monopole excitation system and contains a pin which can be received in a coaxial wave guide. The dielectric secondary ring 9 is also shown.

For the purpose of clarity, the function of the distance measuring device and method for measuring the distance according to the invention shall be illustrated in more detail in the following.

The feeding system consists of a coaxial monopole excitation system. By feeding-in a transverse electromagnetic wave, i.e. TEM wave, in the coaxial feeding or input area 3, the monopole system excites a circular wave guide wave with the characteristic E-field type of the E01 wave. This wave propagates inside the propagation cylinder in axial direction. When the wave encounters a reflection body, i.e. the piston in the case of a pneumatic and hydraulic cylinder, the wave is reflected and converted into the coaxial guiding system by the excitation section (monopole) and transmitted to a HF receiver (emission and reception unit). The monopole feeding consists of a multi-step coaxial transformation step acting as coupling probe 3 with a dielectric support system 5 for position and pressure stabilization. A second dielectric ring or secondary ring 9 in the emission area of the monopole, made for example from Lexan, serves as a mechanical limit stop device for the piston and was taken into consideration as a secondary adjustment and emission system in the electrical design of the monopole.

The method according to the invention shall be illustrated in the following using a pneumatic cylinder as an example. In this case, the entire pneumatic cylinder, from piston rod to rear lid, is considered a circular wave guide. In accordance with the geometric dimensions of the cylinder, the emission frequency of the sensor is selected such that mono-mode propagation of the electromagnetic wave is possible (in E01 mode in the example) with the excitation of circular wave guide waves of higher modes being prevented. The excitation of circular wave guide waves of lower modes is prevented by the feeding geometry. The electromagnetic wave cylinder until it encounters the piston serving as the reflection body. The largest part of the electromagnetic wave is reflected at the piston, since the piston show an electrical behavior much like a short-circuit. The reflected wave returns through the cylinder and is received from the cylinder by the same structure used for launching. The phase angle between the launched and the reflected signal is then measured. If the piston changes position, the path length traveled by the electromagnetic wave inside the piston also changes. The change in path length causes a change in the signal propagation delay and therefore also a change in the phase angle between incoming and reflected wave. Therefore, the phase angle between incoming and reflected signal can be used as a measure of the position of the piston. The relationship between piston position and phase angle p is described by the following equation:

$$\varphi = \frac{2\chi * 360°}{\lambda} + \varphi_0$$

in which $\phi_0$ is a phase offset, which is determined mainly by the supply lines and the launching. $\phi_0$ is constant and thus has no influence on the actual measurement of position. The equation shown above also determines the accuracy of the phase measurement that is required to be able to achieve a predetermined accuracy in the position measurement.

Since it is not possible in a phase measurement to distinguish between phase angles of $\phi$ and $\phi+n\times360°$ as a matter of principle, the use of only one frequency would allow measurements on cylinders only up to a maximal piston stroke $<\lambda/2$. In contrast, the use of two or more frequencies allows measurements on pistons with substantial larger length to be made. If two frequencies are used, the wavelengths must not be too different. The following applies to the wavelengths for a cylinder of length 1:

$$\lambda_1 > \lambda_2 > \frac{2l\lambda_1}{2l + \lambda_1}$$

Since the phase angle of the reflected signal cannot be measured directly such that the voltage measured at a mixing transformer output is not directly proportional to the piston position, a suitable algorithm for the position search is needed. Since the output signals is repeated periodically, it is most important to ensure that the position search proceeds unambiguously, i.e. it must be possible to determine unambiguously which period the piston is in. One possibility for determining the position involves recording many measuring values during a frequency sweep. These measuring values are subsequently transformed into the frequency domain by means of a FFT or DFT. The position of the peak of the spectrum thus generated can then be used to determine the position of the piston. As long as no sub-sampling is permitted during the recording of the measuring values, any ambiguity is excluded in this procedure. Moreover, piston position values are obtained in this procedure without having to record a position table. As a disadvantage, the procedure requires the recording of a relatively large number of measuring values and relatively extensive calculation efforts.

Another possibility is to measure at few frequencies only and determine the position of the piston by means of position tables. This simply involves a comparison of the measured values to the values of the points in the position table. The position thus determined corresponds to the value in the table which corresponds most closely to the measured values. A disadvantage of this procedure is that it may be associated with ambiguities. Since a direct phase measurement is not performed, ambiguity cannot be prevented by complying with the condition shown above. Detailed investigations show that the use of only two measuring frequencies always results in points with identical measured values if the length of the cylinder exceed $\lambda/2$. Since this will be the case in most practical applications, it is advisable to work with at least three frequencies. If the three frequencies are selected wisely, there will no longer be positions in which all three measured values are identical. However, the values measured at two piston positions must differ by a minimal difference in order to ensure the lack of ambiguity in the presence of certain measuring errors. It may therefore be advantageous to use more than three frequencies, especially when working with large cylinder lengths. This provides the additional benefit of greater measuring accuracy since the noise or measuring error occurring at only one frequency are suppressed.

The invention claimed is:

1. A coupling probe comprising:
 a base; and
 an engagement portion extending from the base and configured to engage a feeding area of a conducting structure that is further configured to propagate an emitted signal inside the conducting structure to measure a distance inside the conducting structure based on the propagated signal, wherein the engagement portion comprises a pin configured to extend into a coaxial wave guide of the conducting structure.

2. A coupling probe in accordance with claim 1 wherein the engagement portion comprises a generally cylindrical body configured to engage a dielectric support system.

3. A coupling probe in accordance with claim 1 further comprising a generally planar base configured to abut a dielectric support system.

4. A coupling probe in accordance with claim 1 wherein the conducting structure comprises a propagation cylinder and wherein a circular wave guide wave propagates in an axial direction from the engagement portion through the propagation cylinder.

5. A coupling probe in accordance with claim 1 wherein the conducting structure comprises a pneumatic cylinder with a piston, the pneumatic cylinder defining a circular wave guide and the piston defining a reflection body.

6. A coupling probe in accordance with claim 1 wherein the base is generally planar.

7. A coupling probe in accordance with claim 1 wherein the base comprises a circular member.

8. A coupling probe in accordance with claim 1 wherein the engagement portion extends generally from a center of the base.

9. A coupling probe in accordance with claim 1 wherein the feeding area comprises a feeding block and wherein the engagement portion is configured to extend into the feeding block.

10. A coupling probe in accordance with claim 1 wherein the base defines a head of the engagement portion.

11. A coupling probe in accordance with claim 1 wherein the engagement portion comprises an electrically conductive material.

12. A coupling probe in accordance with claim 1 wherein the engagement portion extends substantially perpendicular to the base.

13. A cylinder comprising:
 a piston;
 a lid covering a bore having the piston therein; and
 a coupling probe configured as a monopole excitation system, the coupling probe configured to be integrated into the lid, wherein the coupling probe comprises a triple-step transformation module having a generally planar base with a generally cylindrical body extending from the generally planar base and a pin extending from the generally cylindrical body.

14. A cylinder in accordance with claim 13 further comprising analytical electronics in the lid.

15. A cylinder in accordance with claim 13 further comprising an external electronic interface configured to externally set sensing distances for use in propagating a wave through the bore via the coupling probe.

16. A cylinder in accordance with claim 13 wherein the bore defines a circular wave guide and the piston defines a reflection body.

17. A cylinder in accordance with claim 13 further comprising a dielectric support system configured to connect the coupling probe to the lid.

18. A cylinder in accordance with claim 13 wherein the coupling probe is connected to with plastic jet molding.

* * * * *

UNITED STATES PATENT AND TRADEMARK OFFICE
CERTIFICATE OF CORRECTION

PATENT NO.       : 7,433,573 B2
APPLICATION NO.  : 11/471297
DATED            : October 7, 2008
INVENTOR(S)      : Günther Trummer It is certified that error appears in the above-identified patent and that said Letters Patent is hereby corrected as shown below:

Title page item [73] Assignee, replace the city name of Ottobrun with Ottobrunn.

Signed and Sealed this

Sixth Day of October, 2009

David J. Kappos
*Director of the United States Patent and Trademark Office*